(12) United States Patent
Rudkin

(10) Patent No.: US 7,349,493 B2
(45) Date of Patent: Mar. 25, 2008

(54) DEMODULATION WITH SEPARATE BRANCHES FOR PHASE AND AMPLITUDE

(75) Inventor: Paul Rudkin, Haslingfield (GB)

(73) Assignee: Cadence Design Systems, Inc., San Jose, CA (US)

( * ) Notice: Subject to any disclaimer, the term of this patent is extended or adjusted under 35 U.S.C. 154(b) by 819 days.

(21) Appl. No.: 10/658,379

(22) Filed: Sep. 10, 2003

(65) Prior Publication Data

US 2005/0073944 A1 Apr. 7, 2005

(51) Int. Cl.
*H03D 3/00* (2006.01)
(52) U.S. Cl. ........................................ 375/322; 375/320
(58) Field of Classification Search ................ 375/260, 375/316, 320, 329, 326, 322, 324
See application file for complete search history.

(56) References Cited

U.S. PATENT DOCUMENTS 5,001,727 A * 3/1991 McDavid ..................... 375/326
6,130,577 A * 10/2000 Tamba et al. ................ 329/304

FOREIGN PATENT DOCUMENTS

EP          0738064 A2 * 10/1996
WO       WO9701908      *  1/1997

\* cited by examiner

Primary Examiner—Temesghen Ghebretinsae
(74) Attorney, Agent, or Firm—Kenyon & Kenyon LLP

(57) ABSTRACT

A receiver architecture is disclosed for use in Time-Division Multiple Access (TDMA) and related digital radio applications which combines the principal benefits of the conventional hard-limiting and linear receiver architectures to support switched-antenna diversity and multipath equalisation without the need for receiver gain control. A further feature of the receiver architecture is that minimises the dynamic range needed by the digital signal processing stages thereby reducing complexity, power consumption and cost compared to known arrangements. The (TDMA) radio frequency signal is separated into two components by the analogue section of the receiver: one component characterising the signal's phase, either absolute or differential, the second component characterising the signal's instantaneous magnitude. The (constant-envelope) phase component is digitised by an analogue-to-digital converter (ADC) to form a sequence of phase samples. In a parallel path, the magnitude component is digitised by a second, synchronised ADC, digitally processed to obtain a sequence of coefficients characterising the normalised envelope variations and this is then combined with corresponding (in time) samples of the phase sequence to form a single, composite sequence characterising both the phase and amplitude variations of the received radio frequency signal. This composite sequence is then processed by a digital demodulator/equaliser to recover the transmitted data.

19 Claims, 9 Drawing Sheets

DEMODULATION WITH SEPARATE BRANCHES FOR PHASE AND AMPLITUDE

FIELD OF THE INVENTION

The present invention relates generally to the reception of digitally-modulated TDMA radio signals and in particular to those which have passed through a time-varying and dispersive channel. It facilitates the digitisation, normalisation and subsequent demodulation (both coherent and non-coherent) of such signals.

BACKGROUND OF THE INVENTION

Digital 'Cordless' telephones using Time-Division Multiple Access (TDMA) protocols are now commonplace throughout the world with a range of national and international protocol standards providing a basis for a range of low-cost, low-power products to cater for most short-range office and domestic applications.

In a TDMA communications system, time is divided up into a series of notional, fixed-duration frames which are themselves sub-divided into a number of fixed-duration timeslots. Transmitting equipment samples and temporarily stores user information (which might be speech and/or a digital data stream) and then sends it at high burst data rates over a channel defined by a unique pairing of timeslot and a radio frequency carrier. Receiving equipment demodulates the bursts of timeslot data from received radio frequency carrier and assuming errors are not introduced during transmission process, regenerates the original user information at the original sample rate.

A key functional block within any Cordless telephone is the demodulator which typically sits at the boundary between the analogue radio frequency (RF) and digital baseband sections of the receiver.

Demodulation Techniques

There are basically two types of demodulator: those that generate and maintain a local carrier phase reference and demodulate incoming symbols by comparing samples of the received signal phase with that of the local reference; and those that demodulate incoming symbols by making phase shift measurements directly from the received signal itself. The first demodulation method is generally referred to as 'coherent' and the second 'non-coherent', reflecting the role played by the carrier phase reference.

Both types of demodulator have found widespread use in digital Cordless and digital Cellular telephone systems.

The avoidance of the carrier acquisition and tracking functionality in the non-coherent demodulator increases the design options for low-power, low-complexity receivers and provides some significant operational advantages in fast fading environments and where rapid receiver synchronisation is needed. There are, however, two major drawbacks with this approach. Firstly, non-coherent detection methods are inherently more noisy than their coherent counterparts which reduces receiver sensitivity. Secondly, most channel equalisation methods rely on the existence of a linear channel between transmitter and demodulator and the differential phase detection process of the non-coherent detector introduces a non-linearly which is difficult to overcome without compromising equalisation performance. This basically means that even in only moderately dispersive channels (where multipath causes more than ½ symbol of time dispersion) coherent demodulation can be the only option.

Despite its shortcomings, non-coherent demodulation tends to dominate in short-range Cordless applications where the benefits of low-complexity and fast sync acquisition outweigh the sensitivity and equalisation issues mentioned.

Recent advances in the fields of digital signal processing and very large-scale integration (VLSI) are now allowing the demodulator to be implemented entirely digitally and it is reasonable to assume that forthcoming developments will see the boundary between the analogue and digital sections move further up the analogue receive chain towards the antenna yielding important benefits for equipment cost, reliability and performance.

A common method for realising a digital non-coherent demodulator is by means of a differential detection algorithm implemented on a digital signal processor wherein the modulating symbol sequence is recovered from the received carrier by determining the phase shift over a short period of time (typically a symbol period) and relating the determined phase shift to one of an alphabet of candidate phase shifts each of which denotes a particular transmitted bit or N-bit symbol. One aspect of the present invention is the integration of a such a detector within a receiver architecture.

Radio Architectures

With the move to all-digital demodulation has come the need for wide dynamic range receiver architectures incorporating analogue-to-digital conversion (ADC). Two radio receiver architectures dominate in this area: the types referred to hereafter as 'Linear' and 'Limiting' summarised in the following description.

In a Linear receiver, the ADC is preceded by one or more stages of variable-gain amplification which are jointly controlled in such a way that the signal level applied to the ADC is high enough to exceed the ADC's quantisation noise floor by a margin appropriate for satisfactory data recovery, but low enough to avoid driving the ADC into saturation. It will be apparent that the wider the dynamic range of the ADC the simpler it is for the gain control circuits to achieve a satisfactory operating condition. Gain control may be applied entirely in hardware for example as an integral part of the analogue RF section or by means of a two-stage mechanism employing a level sensing algorithm in the baseband section coupled to digitally-programmable amplifiers in the radio.

With this type of architecture, there are two popular strategies for gain control; one slow acting, the other more rapid but at the same time more complex. In the former, the signal strength is monitored over a number of TDMA frames and the receiver gain adjusted in steps—typically one per frame—to achieve a desired ADC set point. Despite its relative simplicity, this approach has a drawback in fast fading environments where the signal level may vary widely from one frame to the next. This is a particular problem in TDMA systems which employ slow (or frame rate) frequency hopping. In such circumstances it is necessary to increase the dynamic range of the ADC such that gain uncertainty is accommodated in the same way as normal symbol-to-symbol signal level variations. This can have unacceptable implications for the cost and power consumption of the ADC and, due to the requirement for increased dynamic range in the digital baseband processing, downstream digital demodulation circuits.

The second gain control strategy involves fast-acting automatic gain control. Here, the receiver rain is established independently for each receive TDMA burst from the signal level sensed during the preamble portion of the burst (in this context preamble can be considered to be any non-information-bearing symbol sequence prepended to the portion of the burst carrying user data). The response times of the circuits in the AGC circuit must be tailored to ensure that the desired set point is achieved early in the preamble since otherwise the performance of the other receiver synchronisation functions (which also rely on a stable receive preamble) will be compromised. Of particular concern in this respect are the functions of symbol timing recovery and carrier frequency recovery.

In a Limiting receiver, the variable gain stages in the analogue RF section are replaced by one or more fixed gain stages organised in such a way that the signal presented to the ADC is always clipped (hard limited) irrespective of the level applied at the antenna. This completely eliminates the need for gain control but, due to the loss of sisal envelope information, restricts the choice of demodulator to those which can recover the modulating data sequence from the carrier phase information alone (note that signal phase information is retained at the output of a limiting amplifier). This is not normally a problem except at longer ranges when a degree of equalisation may be necessary to mitigate the fast (symbol-rate) fading effects caused by multipath propagation.

Neither of these two radio receiver architectures is ideal under all practical circumstances, each having its own advantages and disadvantages. The Linear receiver provides the demodulator with a faithful representation of the signal received at the antenna allowing application of all conventional demodulation and equalisation techniques but suffers the disadvantage of needing level sensing and gain control functionality which limits its applicability to slow-fading environments—for which frame-by-frame gain tracking is appropriate—and to TDMA protocols featuring redundant burst headers—where burst-by-burst gain acquisition can be considered.

The Limiting receiver, on the other hand, avoids the gain control issue completely but, due to the loss of signal amplitude information, is inappropriate for use in dispersive, multipath channels requiring equalisation.

Both architectures discussed above are applicable to both coherent and non-coherent demodulators.

Equalisation

The nature of the propagation environment between the antennas of the transmitter and receiver is crucial to the performance of the TDMA radio link and thus the service quality perceived by the user. A particular concern, especially at long ranges, is the effect of what is known in the art as multipath propagation. This is caused when signals reflect from walls, hills, buildings and high-sided vehicles at different ranges resulting in the creation of echoes of the wanted signal at the receiver. The echoes can cause a number of undesirable effects, depending upon their amplitude, phase and delay relative to the wanted component of the signal and each other. These effects range from simple power fades, in channels subject to only small amounts of dispersion, to inter-symbol interference in highly dispersive multipath channels.

In many TDMA radio communication systems, the symbol rate, modulation scheme, transmit power and operating range are deliberately chosen to ensure that, where multipath propagation exists, the delay interval between the arrival of the earliest and latest echo is sufficiently small as a proportion of the transmitted symbol period to cause, at worst, power fades. These can be mitigated with relatively simple techniques such as switched-antenna diversity implemented at the transmitter, receiver or both, such as will be described later.

The dynamic range requirements of both the conventional and diverse receiver configurations are adequately satisfied by the Limiting type of receiver architecture.

However, in order to employ a Linear receiver with the latter it is necessary to use an ADC with dynamic range compatible with worst-case signal level difference between antennas (which could be several tens of Decibels) or have a gain control mechanism capable of establishing the receiver gain independently for each antenna within a time period no greater than that needed to establish the received signal strength. Whilst feasible, both solutions are difficult to achieve in practice and in the flat-fading channel which dominates short-range Cordless applications, the Limiting receiver is evidently the most appropriate of the two candidate receiver architectures.

The choice is not so clear-cut in long-range and non-line-of-sight applications where the channel introduces significant levels of intersymbol interference and where equalisation is warranted. In order to understand the reasons why, it is necessary to consider basic equalisation principles and the impact of the 'non-linear' radio channel.

A considerable volume of work has been carried out in the field of multipath equalisation with many technical publications related to the subject. A broad coverage of the subject is presented in the book "Adaptive Filter Theory" by Simon Haykin (Prentice Hall). This book also includes detailed descriptions of the many algorithms employed in current digital radio communications equipment.

Generally speaking, an equaliser models the radio channel as a superposition of variable-delay and variable-phase signal paths and mitigates its effects using one of two strategies. In the first strategy, the equaliser derives and then applies a filter to the received signal which compensates for the time dispersion introduced during transmission. Ideally, the composite channel formed by concatenating the radio channel with the equalisation filter has a unit impulse response allowing the original transmit symbol sequence to be regenerated at its output. Demodulation is then a simple case of comparing received symbols one-by-one with the candidates known to have been transmitted and choosing the most likely according to some predefined selection criterion. Decision feedback equalisers and tapped delay line (also known as linear) equalisers fall into this category.

The second equalisation approach is to derive an estimate of the channel impulse response from the received signal (using known properties of the transmitted sequence) and then to modify the receiver's modulation symbol alphabet to account for its effects. In this case demodulation involves comparing the distorted received symbol samples with the (distorted) transmit prototypes formed by combining the undistorted transmit symbols with the estimated channel impulse response.

Broad comparisons can be drawn between this approach and that used for decoding convolutional binary codes since during transmission, the transmit symbol sequence is convolved with the channel impulse response in the same way that a raw transmit bit stream is encoded by convolving with an encoder polynomial. In both cases, optimum decoder performance requires that decoding is performed by means of maximum-likelihood sequence estimation (MLSE) techniques rather than on the symbol-by-symbol, or bit-by-bit basis used by the decision feedback and tapped delay-line equalisers.

Although the two equalisation strategies are quite different in their detailed treatment of the received signal their underlying principles are identical in the sense that they assume a linear model of the channel. This is a big problem for the Limiting receiver which strips off signal envelope (amplitude) information presenting the equaliser with the worst kind of nonlinear channel. For this reason, equalisation is normally not possible with Limiting receivers.

Nonetheless, given the advantages of the Limiting receiver in the majority of TDMA applications, there is strong motivation for making it compatible with equalisation, both in the case of coherent and non-coherent demodulation.

SUMMARY OF THE INVENTION

The present invention provides a method or demodulating a received phase and/or amplitude modulated signal comprising:

deriving from said received signal a first sequence of samples representative of the phase of the received signal;

deriving from said received signal a second sequence of samples representative of the received signal envelope; and combining respective ones of said first sequence of samples and said second sequence of samples to output a demodulated representation of said received signal.

The present invention also provides apparatus arranged to receive and demodulate a phase and/or amplitude modulated signal comprising:

means arranged to derive from said received signal a first sequence of samples representative of the phase of the received signal;

means arranged to derive from said received signal, a second sequence of samples representative of the received signal envelope; and means arranged to combine respective ones of said first sequence of samples and said second sequence of samples and to output a demodulated representation of said received signal.

This approach provides advantages usually associated with the above described Linear receiver in that both phase and amplitude information is contained in the output. However, it is not necessary to provide gain control etc. to account for fading environments because the absolute amplitude is not required, rather the change in amplitude is used for the detection.

It is thus an advantage of the present invention that a wide-dynamic-range radio receiver architecture is provided which is compatible with the requirements of digital, coherent and non-coherent demodulation and equalisation but which avoids the necessity for, and control of, variable gain amplification in the analogue RF section.

Preferably, the second sequence of samples mentioned above is derived by firstly deriving from said received signal a continuous time signal representative of the instantaneous amplitude or power of the received signal, digitising said continuous time signal and storing the digital samples so generated, determining a reference value of the stored samples over a predetermined time duration, and normalising the stored digital samples utilising the reference value to output the second sequence of samples.

Preferably this reference value is the peal amplitude or power value in the predetermined time duration.

In the first embodiment of the invention the first sequence of samples mentioned above is derived by hard limit amplifying the received signal and performing phase detection on the amplified signals to generate a continuous time signal representative of the absolute phase of the received signal and digitising the continuous time signal to output a sequence of samples of the absolute phase of the receive signal as said first sequence of samples.

In a second embodiment of the invention, the first sequence of samples is derived by hard limit amplifying the receive signal and performing phase detection on the amplified signal to generate a continuous time signal representative of the absolute phase of the receive signal, digitising said continuous time signal to produce a sequence of absolute phase samples, and performing differential phase detection on said sequence of samples to output a sequence of samples each of which characterises the phase shift between pairs of samples of the absolute phase a predetermined number of digitising sample periods apart as said first sequence of samples.

BRIEF DESCRIPTION OF THE DRAWINGS

The present invention will be better understood from the following description of preferred embodiments given by way of example and with reference to the accompanying drawings in which.

DETAILED DESCRIPTION OF PREFERRED EMBODIMENTS

The following description describes receiver architectures for use in Time-Division Multiple Access (TDMA) and related digital radio applications which combine the principal benefits of the conventional Limiting and Linear receiver architectures to support switched-antenna diversity and multipath equalisation without the need for receiver gain control.

In the preferred embodiments the (TDMA) radio frequency signal is separated into two components by the analogue section of the radio receiver; one component characterising the signal's instantaneous phase the second component characterising the signal's instantaneous magnitude. In one embodiment, the (constant-envelope) absolute phase component is digitised by an analogue-to-digital converter (ADC) and then digitally processed to form a sequence of differential phase samples. In another embodiment the (constant envelope) phase component is digitised by an ADC to form a sequence of absolute phase samples.

In both embodiments a parallel path is provided in which the magnitude component of the signal is digitised by a further, synchronised ADC, digitally processed to obtain a sequence of envelope coefficients and this is then combined with corresponding (time) samples in the phase sequence to form a single, composite sequence characterising both the phase and amplitude variations of the received radio frequency signal. This composite sequence is then processed by a digital demodulator to recover the transmitted data. The retention of the amplitude information permits equalisation etc. to be performed in the demodulator for both the coherent and non-coherent arrangements.

In order that the present invention will be fully understood, some aspects of conventional devices will be described in the following with reference to certain of the drawings.

In known arrangements employing switched-antenna diversity schemes, the receiver is provided with a pair of antennas separated (in space) by a few wavelengths of the radio frequency carrier. The antenna separation is chosen to minimise the statistical dependency (correlation) between signals arriving at the two antennas so that there is a low probability of both antennas sitting in a power fade simultaneously. The receiver is then configured to select the antenna exhibiting the highest signal strength or highest signal quality at any particular time.

Figure 1:
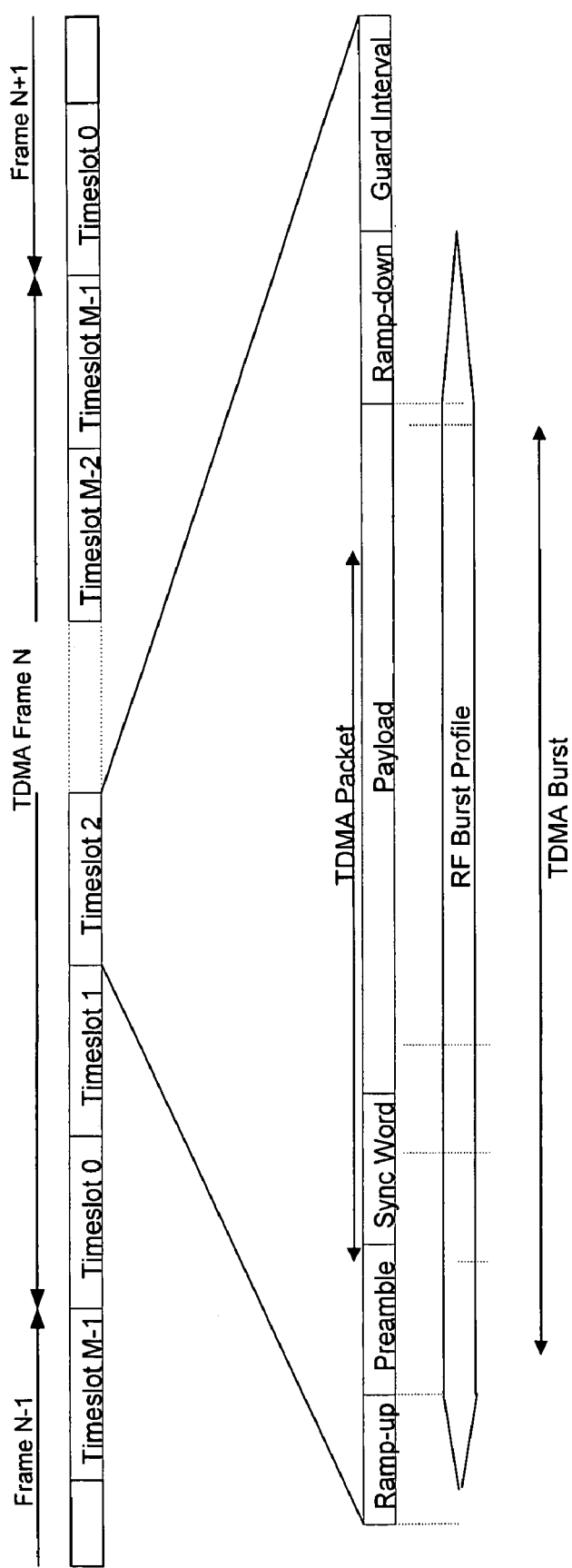
FIG. 1 shows the frame, packet and burst structures used by a typical Cordless TDMA system.

In point-to-point (fixed) and low-speed applications the method used in the receiver to select the best antenna can often be 'retrospective', employing information obtained in previous timeslots to determine the best antenna for a future timeslot. These schemes have limited usefulness in situations where the channel varies significantly from one TDMA frame to the next. In these situations, and where the TDMA protocol allows, improved performance can be obtained with only a small increase in receiver complexity by using more 'pre-emptive' schemes which judge the relative reception quality at the two antennas just prior to the burst payload. By way of example, consider the simplistic TDMA packet structure illustrated in FIG. 1.

The packet comprises a small number of fixed-length fields:

Ramp-Up Field

A few symbols allocated to allow the transmitting equipment to turn on its power amplifier gradually—necessary to limit the generation of interference outside the intended TDMA RF channel;

Preamble Sequence

A sequence of symbols which has properties specifically chosen to facilitate simple and rapid symbol synchronisation of the TDMA time reference used by receiving equipment;

Synchronisation Word

A sequence of symbols which has properties specifically chosen to allow simple and rapid packet (slot) synchronisation of the TDMA time reference used by receiving equipment and to earmark the start of the user data (payload);

Payload

A packet of user data sub-multiplexed with associated signalling and error control data required by the higher layers of the TDMA protocol;

Ramp-Down Field

A few symbols allocated to allow a transmitter to turn off its power amplifier gradually—necessary to limit the generation of interference outside the intended TDMA RF channel.

Figure 2:
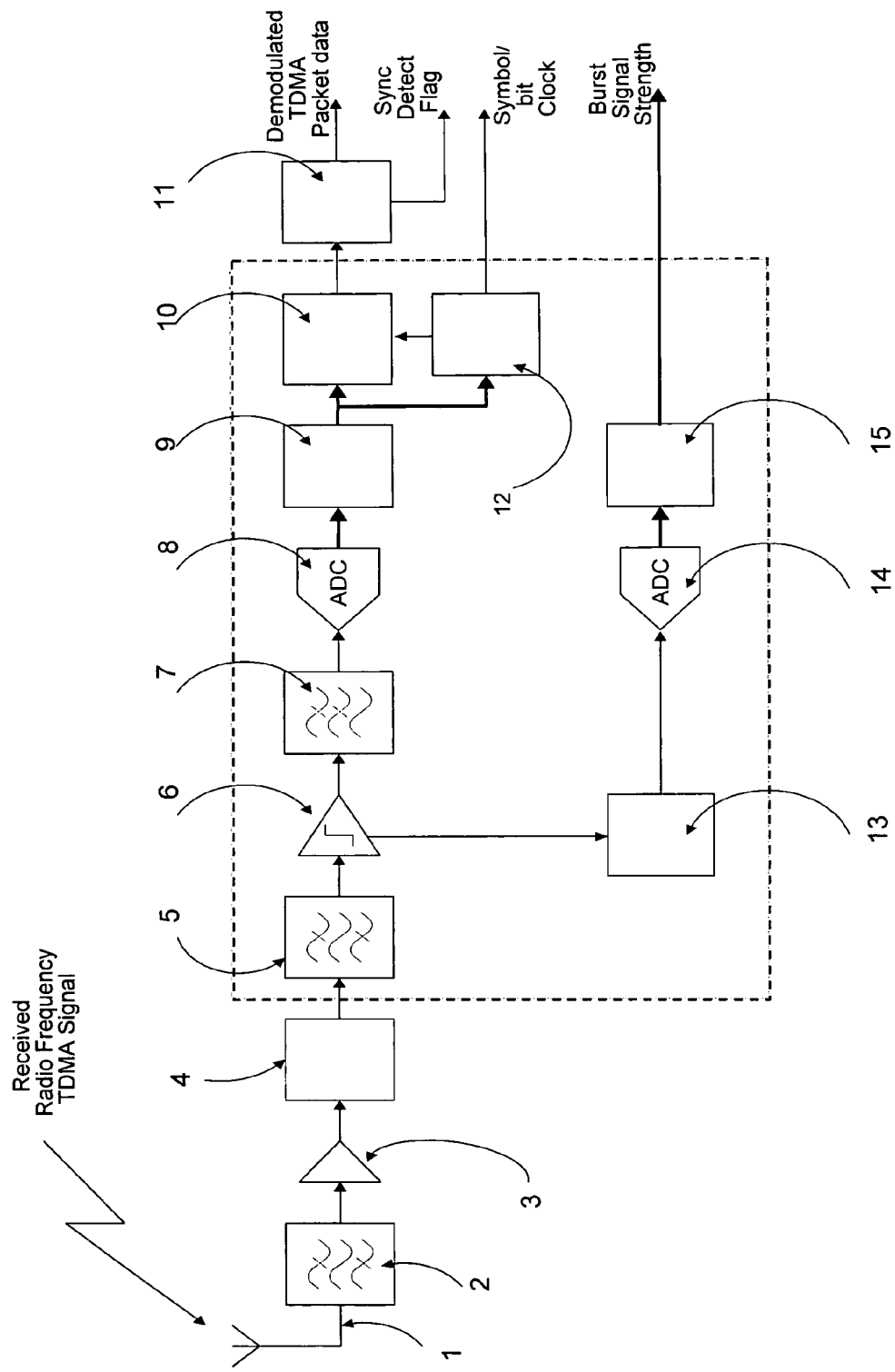
FIG. 2 is a block diagram of a conventional, non-coherent TDMA receiver.

In the conventional non-coherent digital receiver system depicted in FIG. 2, the receive circuitry is activated just prior to the selected receive timeslot. Non-coherent (differential phase) detector 9 operating at the output of ADC 8 generates a baseband signal representation of the modulating symbol sequence which is fed to phase-locked loop 12 and demodulator 10. The phase-locked-loop is enabled to recover a symbol clock from the incoming preamble sequence and this clock is then used to synchronise the transfer of demodulated symbols from the demodulator to the downstream symbol processing hardware. Demodulated symbols (bits) are initially applied to Sync correlator 11 which establishes the position of the Sync Word in the receive data stream and uses detection events to synchronise the processing and capture of demodulated data from the burst payload. In this conventional system, the receiver is attached to a single antenna 1 and RF signal strength information, derived by the signal strength detector 13, is used by the higher layers of the TDMA protocol for link quality assessment and channel selection but plays no part in the burst demodulation process itself. Accordingly, the response time of the circuits associated with received signal strength indication (RSSI) need not be particularly fast and are generally designed to provide a lone-term (burst) measure of received power.

Figure 3:
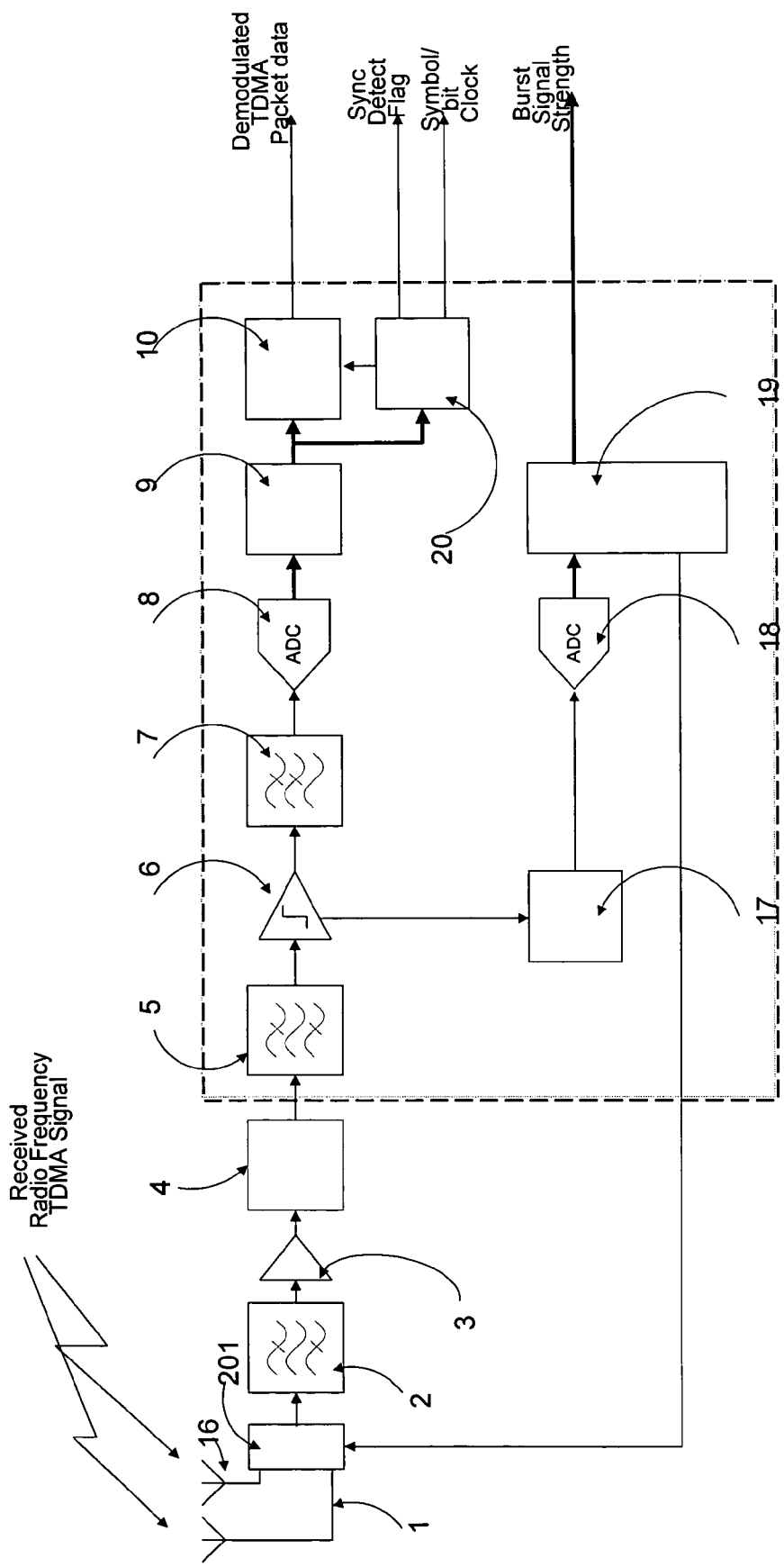
FIG. 3 is a block diagram of the conventional, non-coherent TDMA receiver according to FIG. 2 adapted to perform antenna-switched diversity within the preamble field of the burst.

By contrast, the enhanced receiver system shown in FIG. 3 uses a pair of antennas, rapidly-responding RSSI and a considerably revised synchronisation strategy to support pre-emptive selection diversity in the manner described. With reference to FIG. 3, the radio frequency TDMA signal is received by antennas 1 and 16 which are connected to the analogue section of the receiver through switch 201. The signal strength from each antenna is sampled alternately during two short RSSI analysis windows positioned within the burst preamble. At the end of the later of the two windows, a signal strength comparison is performed by the diversity processing block 19 and the antenna exhibiting the highest signal strength is selected for reception of the Sync Word and remainder of the TDMA burst. In order to maximise the amount of preamble available for antenna assessment without compromising the performance of the symbol timing recovery, the received Sync Word is used for both slot and symbol synchronisation and the response time of the RSSI circuit is designed to be fast enough to switch from one antenna to the other and settle within a few preamble symbols.

An important distinction between the Sync correlators 11 and 20 of FIGS. 2 and 3, respectively, is that in the former the correlation is performed on a bit-level representation of the demodulated Sync Word whereas in the latter, due to the requirement to perform joint timing recovery and Sync Word detection, the correlation is performed prior to demodulation on a differential-phase representation of the received signal.

In these conventional receivers, RSSI provides a burst-by-burst measure of signal strength. In the diverse receiver of FIG. 3, the response time of the RSSI was faster than in FIG. 2 to allow rapid switching between signals from two independent antennas and signal strength assessment within short windows positioned within the burst preamble sequence.

Figure 4:
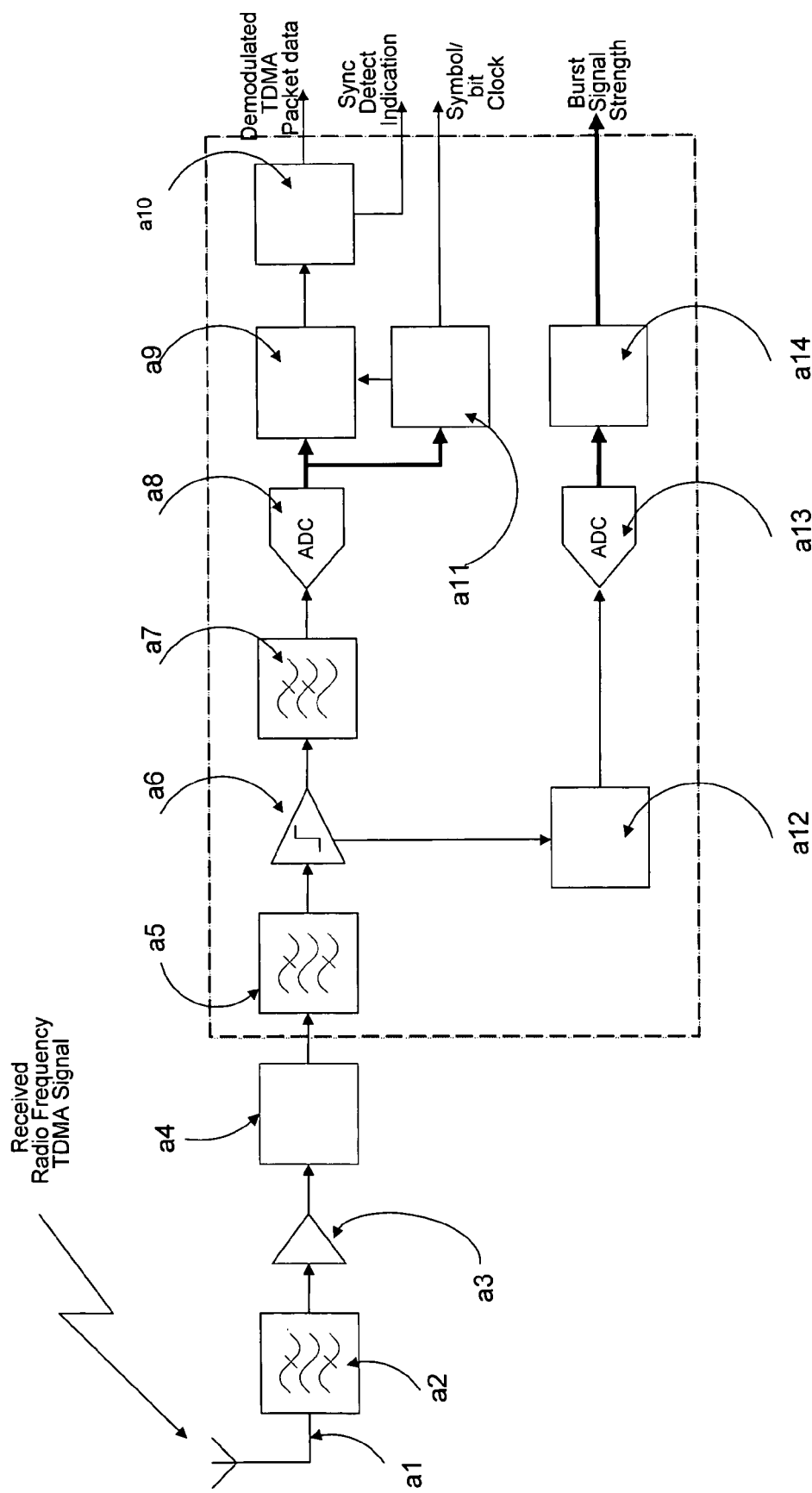
FIG. 4 is a block diagram of a conventional TDMA cordless coherent receiver employing a limiting architecture and digital demodulator.
Figure 5:
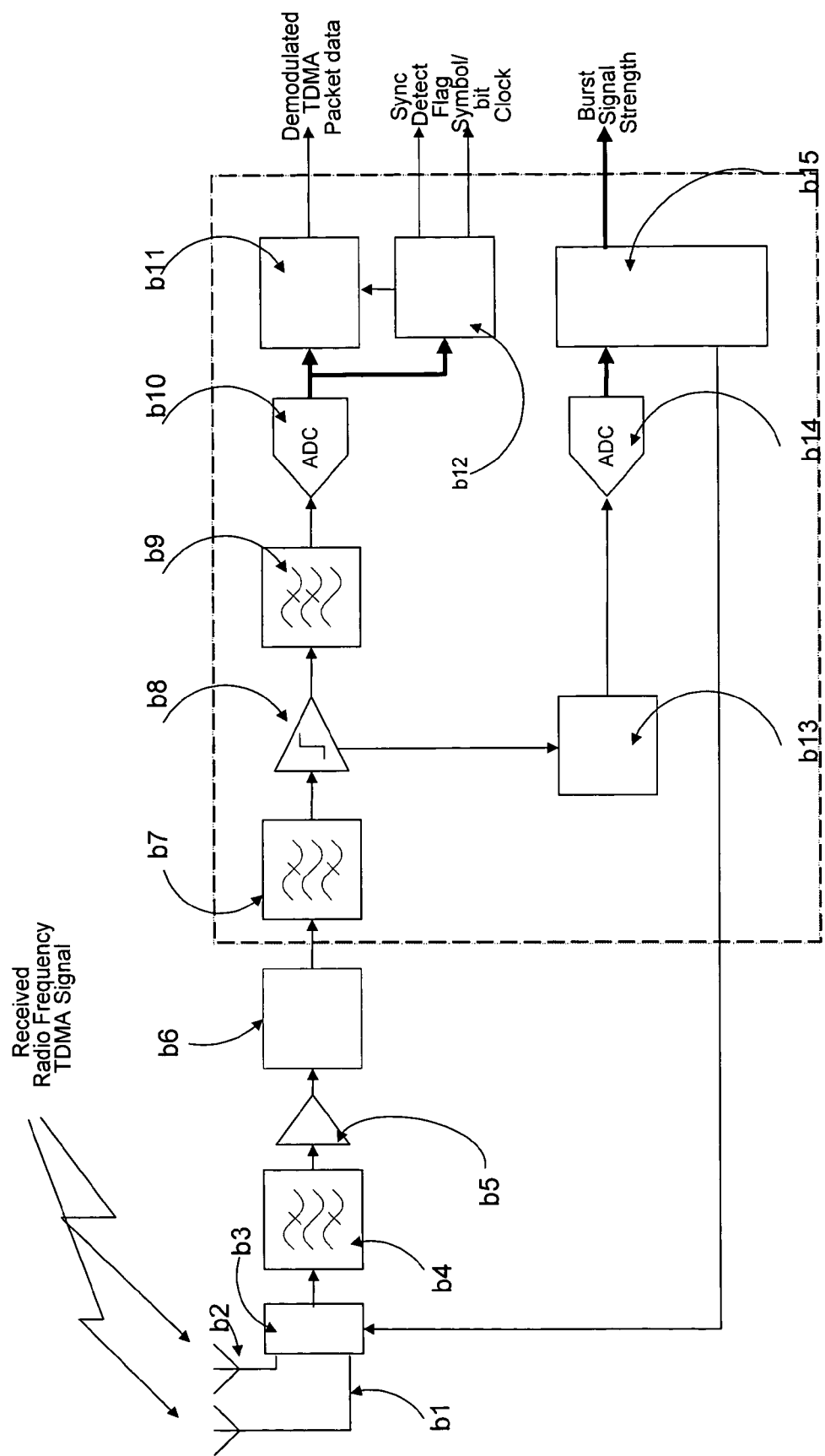
FIG. 5 is a block diagram of the receiver according to FIG. 4 adapted to perform antenna-switched diversity within the preamble portion of the received TDMA burst.

Known coherent receivers corresponding to the non-coherent systems illustrated in FIGS. 2 and 3 are illustrated in FIGS. 4 and 5 and are described in detail in the following.

In the conventional digital receiver system depicted in FIG. 4, the receive circuitry is activated just prior to the selected TDMA receive timeslot. The radio frequency signal is isolated, amplified and downconverted by the action of circuit and filter blocks a2, a3, a4 and a5. The gain of intermediate amplifier chain a6 is set such that on receipt of a suitably modulated signal, at any arbitrary level within the dynamic range of the radio receiver, the output is driven into saturation (hard-limited) and stripped of its amplitude variations. Accordingly, at the output of amplifier chain a6 the signal approximates a variable duty cycle square-wave whose absolute phase is defined implicitly by the timings of its high-to-low and low-to-high transitions. Interpolation filter a7 performs time-to-voltage conversion from transitions applied at its input and in so doing regenerates the continuous phase/time characteristic of the down-converted radio frequency TDMA signal received at the input to amplifier chain a6.

After digitisation by analogue-to-digital converter (ADC) a8 the signal is presented to symbol timing recovery block a11 and demodulator a9.

The symbol timing recovery block is enabled to recover a symbol clock from the incoming preamble sequence and this clock is then used to synchronise the transfer of demodulated symbols from the demodulator to the downstream symbol processing hardware.

Demodulated symbols (bits) are initially applied to Sync correlator a10 which establishes the position of the Sync Word in the receive data stream and uses detection events to synchronise the processing and capture of demodulated data from the burst payload.

In this conventional system, the receiver is attached to a single antenna a1 and RF signal strength information, derived by the signal strength detector a12, is used by the higher layers of the TDMA protocol for link quality assessment and channel selection but plays no part in the burst demodulation process itself. Accordingly, the response time of the circuits associated with received signal strength indication (RSSI) needn't be particularly fast and are generally designed to provide a long-term (burst) measure of received power.

By contrast, the enhanced receiver system shown in FIG. 5 uses a pair of antennas, rapidly-responding RSSI and a considerably revised synchronisation strategy to support pre-emptive selection diversity in the manner described previously. With reference to FIG. 3, the radio frequency TDMA signal is now received by two antennas (b1, b2) which are connected to the analogue section of the receiver through switch b3. The signal strength from each antenna is sampled alternately during two short RSSI analysis windows positioned, by the receiver's timing recovery and synchronisation circuits, to be within the preamble portion of the received slot. At the end of the later of the two windows, a signal strength comparison is performed by the diversity processing block b15 and the antenna exhibiting the highest signal strength is selected for reception of the Sync Word and remainder of the TDMA burst. In order to maximise the amount of preamble available for antenna assessment without compromising the performance of the symbol timing recovery, the received Sync Word is used for both slot and symbol synchronisation in Correlator b12 and the response time of the RSSI circuit is designed to be fast enough to switch from one antenna to the other and settle within a few preamble symbols.

An important distinction between the Sync correlators a11 and b12 of FIGS. 2 and 3, respectively, is that in the former the correlation is performed at the output of the demodulator on a bit-level representation of the demodulated Sync Word whereas in the latter, due to the requirement to perform joint timing recovery and Sync Word detection the correlation is performed at the input to the demodulator on the digitised phase signal itself.

In both of the foregoing receivers, RSSI provides a burst-by-burst measure of signal strength. However, in the diverse receiver of FIG. 3, the response time of the RSSI must be faster than the basic receiver of FIG. 2 to allow rapid switching between signals from two independent antennas and signal strength assessment within short windows positioned within the burst preamble sequence. In both cases, the Limiting receiver removes amplitude variations from the digitised signal and this prevents the demodulator from mitigating the effects of intersymbol interference using known equalisation methods.

In the present invention the RSSI response time is made faster still—communsurate with the radio channel bandwidth—such that it is possible to devise a signal processing method wherein the signal phase information provided by the normal Limiting signal path is augmented with signal amplitude information derived from the RSSI signal path to form a single, composite signal with characteristics similar to those provided at the output of a Linear receiver and thus suitable for equalisation.

Figure 6:
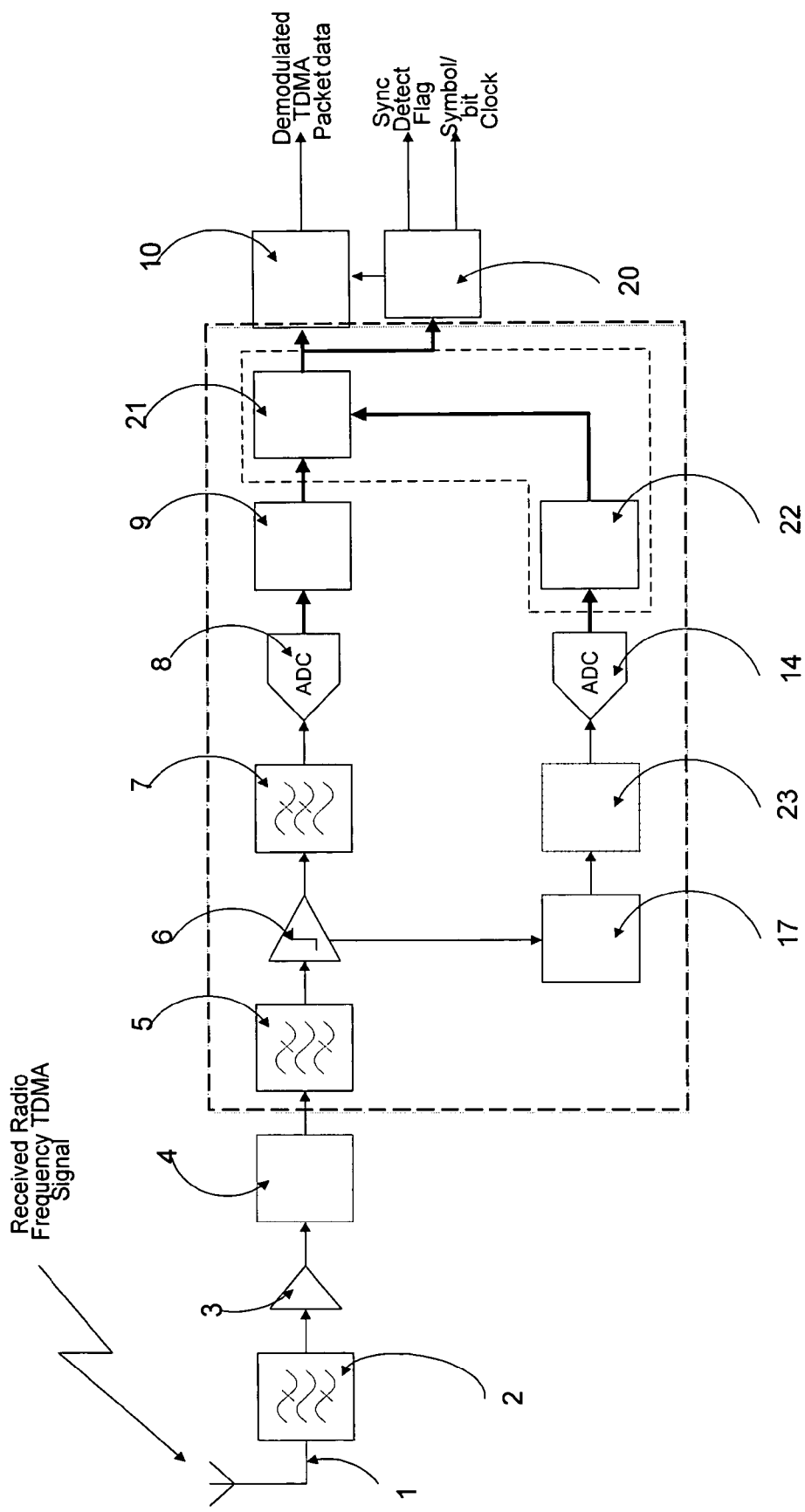
FIG. 6 is a block diagram of a non-coherent, TDMA receiver in accordance with the first embodiment of the present invention.

FIG. 6 shows a receiver in accordance with the first embodiment of the present invention. The salient features of this new architecture will now be described in detail.

A radio frequency TDMA signal is received by antenna 1 which is connected to the chain of filters 2/5/7, amplifiers 3/6 and down-conversion stages 4 which comprise the analogue section of the receiver and which correspond to the like-numbered parts of FIGS. 2 and 3. The pain of amplifier chain 6 is set such that on receipt of a suitably modulated signal, at any arbitrary level within the dynamic range of the radio receiver, the output is driven into saturation (hard-limited) and stripped of its amplitude variations. Accordingly, at the output of amplifier 6 the signal approximates a variable duty cycle square-wave whose absolute phase is defined implicitly by the timings of its high-to-low and low-to-high transitions. Interpolation filter 7 performs time-to-voltage conversion from transitions applied at its input and in so doing regenerates the continuous phase/time characteristic of the down-converted radio frequency TDMA signal received at the input to amplifier chain 6. To simplify cross referencing of the various signals and digital sample sequences within the text, this signal will be referred to as the 'Absolute Phase signal' and other signal names are allocated as appropriate.

A signal characterising the received signal strength is also derived from circuits associated with the limiting amplifier chain 6. In known receiver systems, this 'Amplitude signal' normally has a logarithmic relationship with applied input signal level a feature which, whilst not essential for the present purpose, can be exploited to reduce the dynamic range required of subsequent circuit blocks most notably the analogue-to-digital converter (ADC) 14 used for digitisation.

ADCs 8 and 14 digitise the Absolute Phase and Amplitude signals respectively to form corresponding sequences of digital Absolute Phase and Amplitude samples. The ADCs sampling clocks are synchronised from a common time reference although they needn't necessarily operate at a common sampling frequency or phase.

Samples from the Absolute Phase sequence are numerically processed by Differential Phase Detector 9 to form a 'Differential Phase sequence'. The Differential Phase sequence characterises the phase shift between adjacent samples in the Absolute Phase sequence or between samples separated by more than 1 digitising sample period. One algorithm for computing a complex Differential Phase sequence from the source Absolute Phase sequence is illustrated by the signal flow diagram in FIG. 8. It will be recognised that there are several other methods for deriving the former from the latter and that all such methods may be used within the scope of the present invention.

The Envelope Extractor 22 numerically processes the samples from the Amplitude sequence to derive a new sequence of what are hereafter referred to as Envelope Coefficients. This will be described in detail below, after an outline of the second embodiment has been given.

Figure 7:
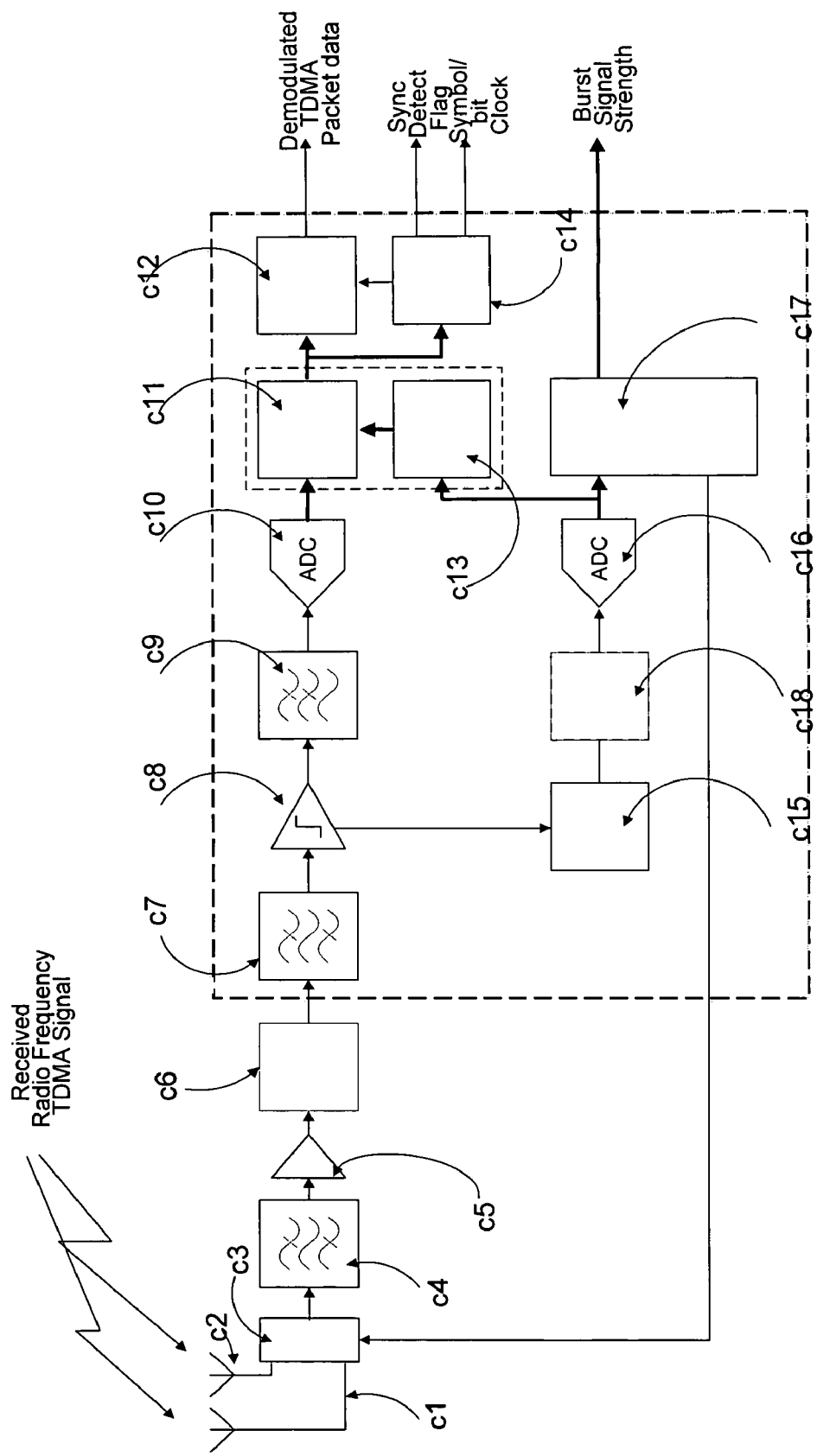
FIG. 7 is a block diagram of a coherent limiting TDMA cordless receiver in accordance with the second embodiment of the present invention.

FIG. 7 shows a receiver in accordance with the second embodiment of the present invention. The salient features of this new architecture will now be described in detail.

The analogue section of the receiver is similar to that described previously in FIG. 3. The limiting amplifier block c8 produces a constant-envelope. 'Phase' signal component at the output of interpolation filter c9 together with an 'Amplitude' signal component at the output of the signal strength detector c15 which has a response time commensurate with channel bandwidth thereby allowing symbol-rate variations in the received signal amplitude to be followed. In known receiver systems, such as depicted in FIGS. 2 and 3, this Amplitude signal has a logarithmic relationship with applied input signal level a feature which, whilst not essential for the present purpose, can be exploited to reduce the dynamic range, and thus complexity and power consumption, required of subsequent circuit blocks most notably the ADC c16 used for digitisation.

ADCs c10 and c16 digitise the Phase and Amplitude signals respectively to form corresponding sequences of Phase and Amplitude samples. The ADCs' sampling clocks are synchronised from a common time reference although they needn't necessarily operate at a common sampling frequency or phase.

In an alternative arrangement, derivation of the "Phase" signal may be achieved by providing one or more cascaded amplifiers, a quadrature down-mixing circuit and analogue filters such that the "Phase" signal is produced as a complex baseband signal having two components, preferably orthogonal, which are subsequently digitised separately.

Simply stated, the combined purpose of the Envelope Extraction 22, and subsequent Envelope Modulation 21 or Envelope Insertion c11 processes, and the main aspect of the present invention, is to introduce the amplitude variations on the Phase sequence (either differential or absolute phase) which would have been present had the received radio frequency TDMA signal been digitised at the output of a Linear receiver with its amplitude formation intact and with the receiver gain set to use all of the available ADC dynamic range.

The Envelope Extractor 22, c13 numerically processes the samples from the Amplitude sequence to derive a new sequence of what are hereafter referred to as Envelope Coefficients. At least one such Envelope Coefficient is generated for each sample in the digitised Phase sequence and the scheduling of the ADCs and subsequent numerical processing is organised in such a way that the time correspondence between Phase and Amplitude signals at the input to the Limiting amplifier is restored prior to recombination. Analogue delay stage 23, c18 is included to compensate for differential signal path delays which can not be removed by other means.

The processing performed by the Envelope Extractor depends upon the relationship between the Amplitude signal and the instantaneous magnitude of the received radio frequency TDMA signal. For illustrative purposes, the following description considers the common case of a logarithmic power detector and derives the mathematical relationships underlying the numerical processing carried out by the Envelope Extractor and Envelope Modulator or Insertion.

Much of the mathematics is common to the implementations of the first and second embodiments, and this will be described first in the following, after which it will be made clear when mathematics specifically related to the two embodiments is being discussed.

Samples of the received radio frequency TDMA signal may be represented in polar format by the expression:

$$x_n = r_n e^{j\theta_n} \qquad 1$$

where $x_n$ is an arbitrary signal sample and $r_n$ and $\theta_n$ are its magnitude and phase components respectively.

After hard-limiting, the Absolute Phase sequence retains only the original phase information to produce a series of constant-envelope samples:

$$\phi_n = k_\Phi e^{j\theta_n} \qquad 2$$

where the constant $k_\Phi$ accounts for any gain error in which might cause the magnitude of the constant phase vectors $\phi_n$ to deviate from the ideal value of unity As previously stated, the signal strength detector is assumed to yield an Amplitude signal with a logarithmic power relationship samples of which $a_n$ may be described by the expression:

$$a_n = k_a \times \log_{10}(r_n) + c_a \qquad 3$$

where $k_a$ and $c_a$ are used to denote arbitrary scale factor and DC offset terms respectively and where a base-10 logarithm is assumed for consistency with common practice of calibrating power detectors in Decibels.

In many limited-precision, digital signal processing applications it is both necessary and useful to limit the peak excursion of variables to ensure that they do not exceed the maximum value representable by a single binary word (integer). This is commonly achieved by normalisation with respect to the peak value of the variable in question. In the present invention, the discontinuous nature of the received (TDMA) signal and the presence of a preamble and Sync Word prior to the burst payload are exploited to perform such a normalisation process on the Magnitude signal prior to demodulation of the payload data.

By virtue of the logarithmic representation of the Magnitude signal, normalisation is achieved by simple subtraction as follows:

$$a_n(norm) = a_n - a_{pk} = k_n (\log_{10}(r_n/r_{pk})) \qquad 4$$

Here, $a_{pk}$ is the sample of the Amplitude sequence corresponding to the peak received signal amplitude $r_{pk}$ occurring over a particular segment of the TDMA burst and $a_n$ (norm) is the normalised value of an arbitrary Amplitude sample $a_n$. Note that according to (4) the maximum value of $a_n$ (norm) is zero, all other values being negative.

Figure 9:
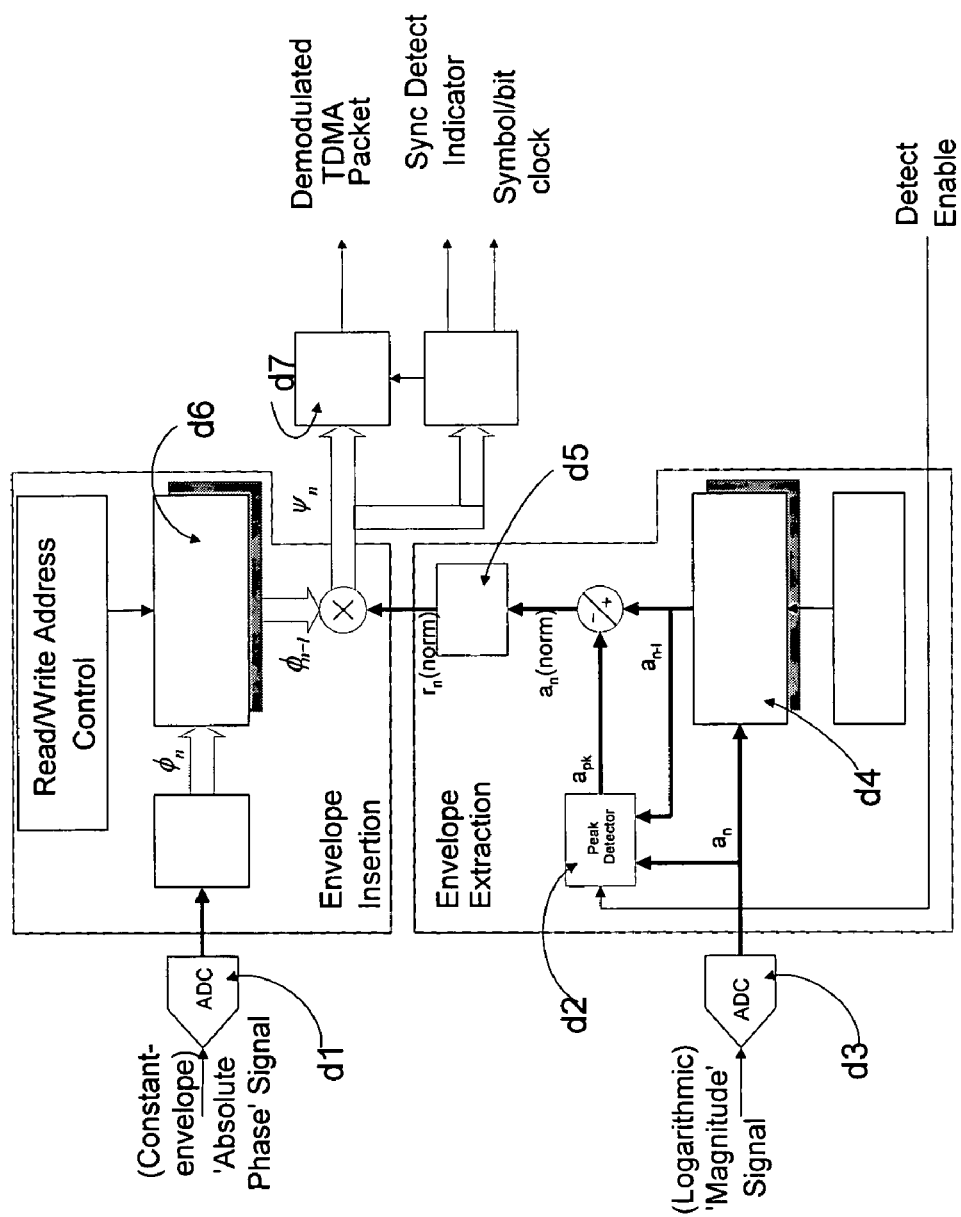
FIG. 9 is a signal flow diagram depicting the preferred techniques for normalising the digitised magnitude signal and for combining the normalised magnitude signal with the digitised phase signal to form the final digital signal in the second embodiment of the present invention.

In the preferred implementation of the Envelope Extraction and Insertion in the second embodiment shown in FIG. 9, the relevant signal segment is stored in sequential, first-in-first-out (FIFO) buffer d4 implemented with either a circular buffer or shift register. A second such buffer d6 is necessary for the storage of corresponding Phase samples received during the same signal segment.

The duration of the signal segment used for peak detection governs the delay through the receiver (RF input to data output), the amount of storage needed for Magnitude and Phase samples and the accuracy of the Envelope Insertion step to be described. The presence of preamble and Sync Word fields on the TDMA burst provide two main options in this respect:

The first option is to detect the peak across the entire burst. This implies storing a complete burst's worth of Magnitude and Phase samples in the FIFO buffers and a decoding delay of at least 1 burst.

FIG. 9 depicts the second option, which exploits the presence of the preamble and Sync Word to reduce the delay and storage requirements as follows: Peak detector d2 is enabled to operate during the Sync Word segment of the received signal only which, due to the random nature of the sequence, is sufficient to provide an accurate estimate of the peak value across the burst as a whole. The detector is reset prior to the Sync Word window in the received timeslot and its value held at the end of the Sync Word window. Thereafter received Magnitude samples are normalised with respect to the held peak whether or not they exceed the peak value. Values of $a_n$ received after the end of the Sync Word and which do exceed $a_{pk}$ are clipped to give 0 after normalisation.

Rearranging equation 4 to obtain equivalent (linear) normalised magnitude $r_n$(norm) in terms of the (logarithmic) normalised Amplitude sample $a_n$ yields:

$$r_n(norm) = 10^{\frac{a_n - a_{pk}}{k_a}} \quad 5$$

In FIG. 9, this logarithmic-to-linear conversion is performed by means of lookup table d5. The series of values $r_n$(norm) are the Envelope Coefficients used during Envelope Insertion.

With further reference to FIG. 9 and ignoring the down-conversion stage which serves only to translate the real digital representation of the Phase signal to a complex vector form (each sample having orthogonal components) more amenable to numerical processing. Envelope Insertion can be described mathematically by the expression:

$$\psi_n = r_n(norm) \times \phi_n \quad 6$$

where $\phi_n$ is the constant-envelope Phase sequence from (2) and $\psi$ contains sufficient information about the phase and magnitude variations of the received signal to allow equalisation in the demodulation stage d7.

Referring now to the first embodiment once more, it will be recalled that the wanted normalised signal amplitude $r_n$ (norm) in terms of the normalised Amplitude sample $a_n$ (norm) is:

$$r_n(norm) = 10^{\frac{a_n - a_{pk}}{k_a}} \quad 5$$

Figure 8:
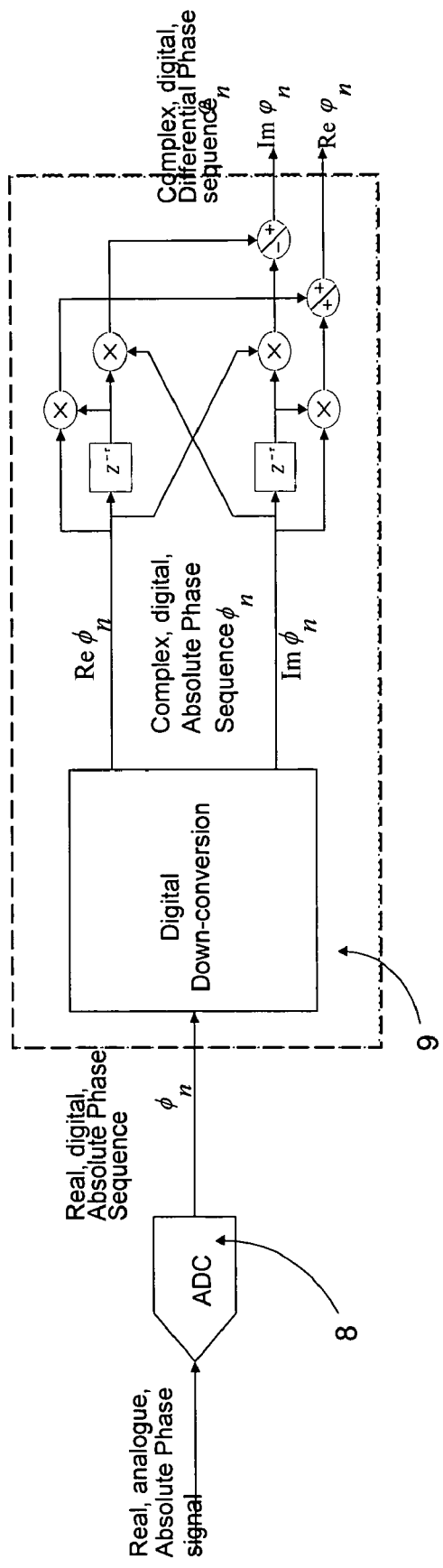
FIG. 8 is a signal flow diagram of the preferred algorithm for performing differential phase detection on a digital processor in the first embodiment of the invention.

With reference to the first embodiment of the invention, the preferred method for differential detection is depicted in FIG. 8, and ignoring the down-conversion stage which serves only to translate the real digital representation of the Absolute Phase signal to a complex vector form (each sample having a real and imaginary vector component) more amenable to numerical processing, the Differential Phase detection process can be described mathematically by the expression:

$$\Phi_n = r_n e^{j\theta_n} \times r_{n-1} e^{-j\theta_{n-t}} \quad 7$$

where $\psi_n$ is an arbitrary Differential Phase vector and the symbol $\tau$ has been used to signify a fixed time delay. In the preferred embodiment, this delay is equivalent to one or more modulation symbol periods and realised with a chain of storage elements configured as a delay line.

As previously described, the action of the hard-limiting amplifier prior to digitisation removes amplitude variations from the Absolute Phase signal and accordingly the magnitude of both the current and delayed samples in the preceding expression can be considered constant. The output from the differential detector may thus be represented as follows:

$$\Phi_n = k_\psi e^{j(\theta_n - \theta_{n-t})} \quad 8$$

where the constant $k_\Phi$ accounts for any gain error which might cause the magnitude of the complex Absolute Phase vectors $\phi_n$ to deviate from unit). The sequence $\Phi_n$ of Differential Phase vectors form one input to the Envelope modulator 21.

In describing the second input sequence and the function of the Envelope Extractor 22 itself, it is appropriate to consider the effect that the Differential Detector would have had on the magnitude components of a sequence of otherwise linear Absolute Phase vectors. Returning to equations (7) and (8) it can be seen that the general relationship describing the Differential Phase vectors to the source Absolute Phase vectors has the form:

$$\Phi_n = k_\Phi r_n r_{n-\tau} e^{j(\theta_n - \theta_{n-t})} \quad 9$$

It will be apparent that the sequence of samples described by (9) can be created from that described by (8) by modulating with a series of Envelope Coefficients formed from the product of the constituent signal magnitude terms. The function of the Envelope Extractor is thus to derive appropriate Envelope Coefficients $e_n$ from the sequence of normalised Amplitude samples $_n a$ (norm) where from (9) and (5):

$$e_n = r_n(norm) \cdot r_{n-\tau}(norm) \quad 10$$
$$= 10^{\frac{a_n - a_{pk}}{k_a}} \times 10^{\frac{a_{n-\tau} - a_{pk}}{k_a}}$$
$$= 10^{\frac{a_n - a_{n-\tau} - a_{pk}}{k_a}}$$

Accordingly, the Envelope Modulator 21 combines the derived Envelope coefficients $e_n$ from the Envelope Extractor 22 and corresponding (in time) Differential Phase vectors $\Phi_n$ from the Differential Phase Detector 9 to form a new sequence $\psi_n$ characterising the amplitude and phase variations of the received radio frequency TDMA signal:

$$\psi_n = e_n \times \Phi_n \quad 11$$

This sequence, which due to the action of the differential phase detector, can not be considered a linear representation of the received radio frequency TDMA signal, but again contains sufficient amplitude and phase information to allow a subsequent, non-coherent demodulator/equaliser to mitigate intersymbol interference induced by a multipath channel.

The invention claimed is:

1. A method of demodulating at least one of a received phase and amplitude modulated signal comprising:
deriving from said received signal a first sequence of samples representative of the phase of the received signal;
deriving from said received signal a second sequence of samples representative of the received signal envelope;
combining respective ones of said first sequence of samples and said second sequence of samples to output a composite sequence of samples representative of said received signal, the composite sequence characterizing phase variations and amplitude variations of the received signal; and
demodulating said composite sequence of samples;
in which said second sequence of samples is derived from a continuous time signal having a logarithmic relationship with the received level signal.

2. A method according to claim 1, wherein said received signal comprises a TDMA signal.

3. A method of demodulating at least one of a received phase and amplitude modulated signal comprising:
deriving from said received signal a first sequence of samples representative of the phase of the received signal;
deriving from said received signal a second sequence of samples representative of the received signal envelope;
combining respective ones of said first sequence of samples and said second sequence of samples to output a composite sequence of samples representative of said received signal, the composite sequence characterizing phase variations and amplitude variations of the received signal; and
demodulating said composite sequence of samples;
wherein said step of deriving said second sequence of samples comprises:
deriving from said received signal a continuous-time signal representative of the instantaneous amplitude or power of the received signal;
digitizing said continuous-time signal and storing the digital samples generated thereby;
determining a reference value of the stored samples over a predetermined time duration; and
normalizing said stored digital samples utilizing said reference value to output said second sequence of samples.

4. A method according to claim 3 wherein said reference value is the peak amplitude or power value in said predetermined time duration.

5. A method according to claim 3, wherein said received signal comprises a TDMA signal.

6. A method of demodulating at least one of a received phase and amplitude modulated signal comprising:
deriving from said received signal a first sequence of samples representative of the phase of the received signal;
deriving from said received signal a second sequence of samples representative of the received signal envelope;
combining respective ones of said first sequence of samples and said second sequence of samples to output a composite sequence of samples representative of said received signal, the composite sequence characterizing phase variations and amplitude variations of the received signal; and
demodulating said composite sequence of samples;
wherein said step of deriving said first sequence of samples comprises:
hard-limit amplifying said received signal and performing phase detection on the amplified signal to generate a continuous-time signal representative of the absolute phase of the received signal; and
digitizing said continuous-time signal to output said first sequence of samples, whereby said first sequence of samples is a sequence of samples representing the absolute phase of the received signal.

7. A method according to claim 6, wherein said step of deriving said first sequence of samples further comprises:
performing differential phase detection on said sequence of absolute phase samples to output said first sequence of samples, whereby the samples in said first sequence characterize the phase shift between pairs of samples a predetermined number of digitizing samples periods apart.

8. A method according to claim 6 further comprising storing said first sequence of samples and providing each of said first sequence of samples for said combining step at times synchronized with said second sequence of samples.

9. An apparatus arranged to receive at least one of a phase and amplitude modulated signal comprising:
means arranged to derive from said received signal a first sequence of samples representative of the phase of the received signal;
means arranged to derive from said received signal a second sequence of samples representative of the received signal envelope; and
means arranged to combine respective ones of said first sequence of samples and said second sequence of samples and to output a demodulated representation of said received signal, said composite sequence characterizing phase variations and amplitude variations of the received signal;
wherein said second sequence of samples is derived from a continuous time signal having a logarithmic relationship with the received level signal.

10. Apparatus according to claim 9 arranged to receive and demodulate a TDMA signal.

11. An apparatus arranged to receive at least one of a phase and amplitude modulated signal comprising:
means arranged to derive from said received signal a first sequence of samples representative of the phase of the received signal;
means arranged to derive from said received signal a second sequence of samples representative of the received signal envelope; and
means arranged to combine respective ones of said first sequence of samples and said second sequence of samples and to output a demodulated representation of said received signal, said composite sequence characterizing phase variations and amplitude variations of the received signal;
wherein said means arranged to derive said second sequence of samples comprises:
means arranged to derive from said received signal a continuous-time signal representative of the instantaneous amplitude or power of said received signal;
digitizing means arranged to digitize said continuous-time signal;

storing means arranged to store the digital samples from said digitizing means;

determining means arranged to determine a reference value of the stored samples over a predetermined time duration; and normalizing means arranged to normalize said samples stored in said storing means utilizing said reference value to output said second sequence of samples.

12. Apparatus according to claim 11 in which said determining means determines said reference value to be the peak amplitude or power in said predetermined time duration.

13. An apparatus according to claim 11 arranged to receive and demodulate a TDMA signal.

14. An apparatus arranged to receive at least one of a phase and amplitude modulated signal comprising:

means arranged to derive from said received signal a first sequence of samples representative of the phase of the received signal;

means arranged to derive from said received signal a second sequence of samples representative of the received signal envelope; and means arranged to combine respective ones of said first sequence of samples and said second sequence of samples and to output a demodulated representation of said received signal, said composite sequence characterizing phase variations and amplitude variations of the received signal; wherein said means arranged to derive said first sequence of samples comprises:

hard-limit amplifying and phase detection means arranged to generate a continuous-time signal representative of the absolute phase of the received signal; and digitizing means arranged to digitize said continuous-time signal to output said first sequence of samples, whereby said first sequence of samples is a sequence of samples representing the absolute phase of the received signal.

15. Apparatus according to claim 14, wherein said means arranged to derive said first sequence of samples further comprises:

differential phase detection means arranged to perform differential phase detection on said sequence of absolute phase samples to output said first sequence of samples, whereby the samples in said first sequence characterize the phase shift between pairs of samples predetermined number of digitizing sample periods apart.

16. Apparatus according to claim 14 further comprising storing means arranged to store said first sequence of samples and to output each of said first sequence of samples at time synchronized with said second sequence of samples.

17. Apparatus according to claim 14, wherein said hard-limit amplifying and phase detection means comprises one or more cascaded amplifiers and analogue filters arranged to output said continuous-time signal at a real intermediate frequency.

18. Apparatus according to claim 14, wherein said hard-limit amplifying and phase detection means comprises one or more cascaded amplifiers, a quadrature down-mixing circuit and analogue filters arranged to output said continuous-time signal as a complex baseband signal having two components.

19. Apparatus according to claim 18 wherein said two components are orthogonal.

* * * * *

UNITED STATES PATENT AND TRADEMARK OFFICE
CERTIFICATE OF CORRECTION

PATENT NO. : 7,349,493 B2  
APPLICATION NO. : 10/658379  
DATED : March 25, 2008  
INVENTOR(S) : Paul Rudkin Page 1 of 1

It is certified that error appears in the above-identified patent and that said Letters Patent is hereby corrected as shown below:

On the Title Page,
Please insert the following sections:

Item --(63) Related U.S. Application Data
Continuation of 09/355,738, filed as application No. PCT/GB98/00355 on February 5, 1998.--

Item --(30)  Foreign Application Priority Data
February 5, 1997 (GB)...........................9702304.8
May 13, 1997 (GB)..............................9709713.3--

Signed and Sealed this
Twentieth Day of March, 2012

David J. Kappos
*Director of the United States Patent and Trademark Office*